United States Patent [19]
Lalonde

[11] Patent Number: 5,697,640
[45] Date of Patent: Dec. 16, 1997

[54] PLEATED AIR BAG

[75] Inventor: Gary R. Lalonde, Clinton Township, Mich.

[73] Assignee: TRW Vehicle Safety Systems Inc., Lyndhurst, Ohio

[21] Appl. No.: 602,440

[22] Filed: Feb. 16, 1996

[51] Int. Cl.⁶ ................................................. B60R 21/16
[52] U.S. Cl. ........................... 280/743.1; 280/728.1
[58] Field of Search .......................... 280/743.1, 728.1, 280/729, 743.2

[56] References Cited

U.S. PATENT DOCUMENTS

| | | | |
|---|---|---|---|
| 4,010,055 | 3/1977 | Oka et al. | 280/743.1 |
| 4,944,529 | 7/1990 | Backhaus | 280/743 |
| 5,360,233 | 11/1994 | Takamiya | 280/743 R |
| 5,445,414 | 8/1995 | Pittman et al. | 280/743.1 |
| 5,454,595 | 10/1995 | Olson et al. | 280/729 |
| 5,568,938 | 10/1996 | Lindstrom | 280/743.1 |

FOREIGN PATENT DOCUMENTS 9418033  8/1994  WIPO .

*Primary Examiner*—Paul N. Dickson
*Attorney, Agent, or Firm*—Tarolli, Sundheim, Covell, Tummino & Szabo

[57] ABSTRACT

An air bag (10) includes a main panel (40) which defines an inflation fluid volume for receiving inflation fluid. The main panel (40) includes a generally rectangular front portion (230) comprising four side panels (60, 62, 64, 66) and having an opening (232) for connection with an inflation fluid source. The main panel (40) includes a rectangular back portion (240) for engagement with the vehicle occupant, and four pleat portions (250, 260, 270, 280). The front portion (230) and the back portion (240) of the main panel (40) provide the air bag (10) with a generally pillow-shaped configuration when inflated. The air bag (10) has four corners when inflated. Each one of the pleat portions (250, 260, 270, 280) of the main panel (40) is disposed at a respective corner of the air bag (10). The pleat portions (250, 260, 270, 280) are disposed between the front portion (230) and the back portion (240) of the main panel (40) when the air bag (10) is deflated. The pleat portions (250, 260, 270, 280) are disposed outside of the pillow-shaped configuration when the air bag (10) is inflated.

18 Claims, 6 Drawing Sheets

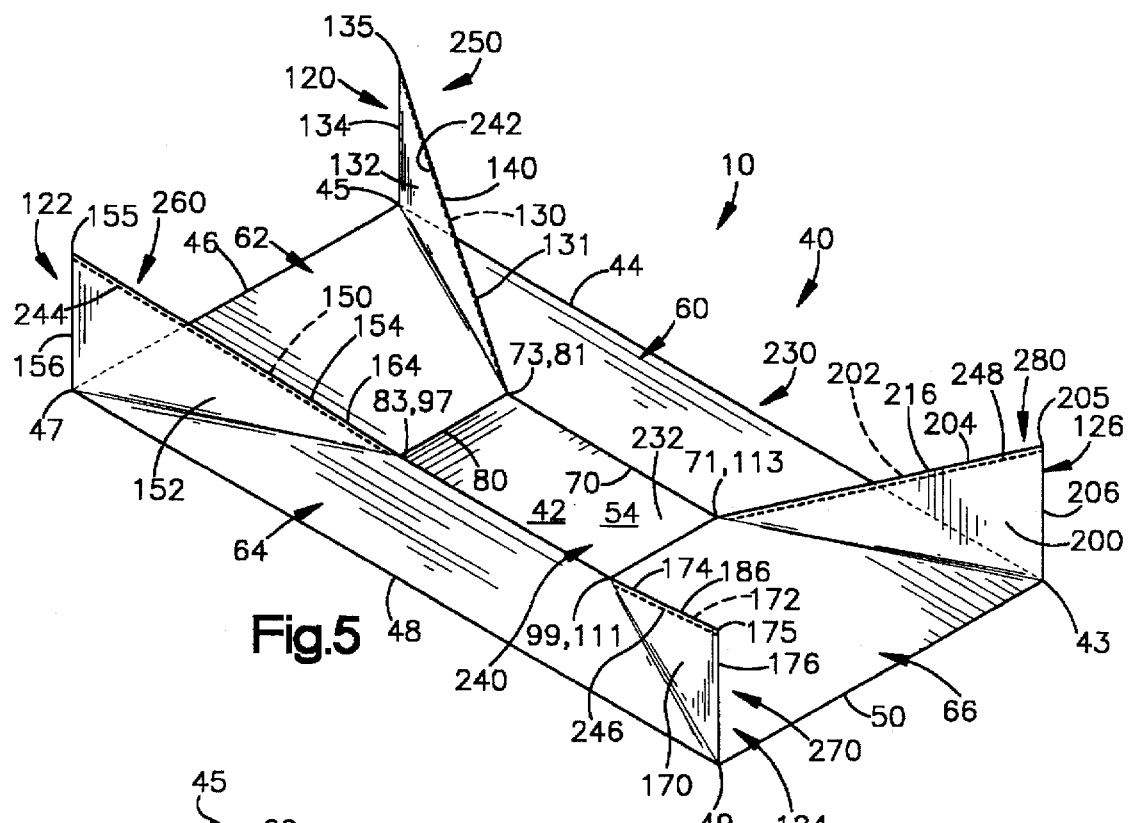
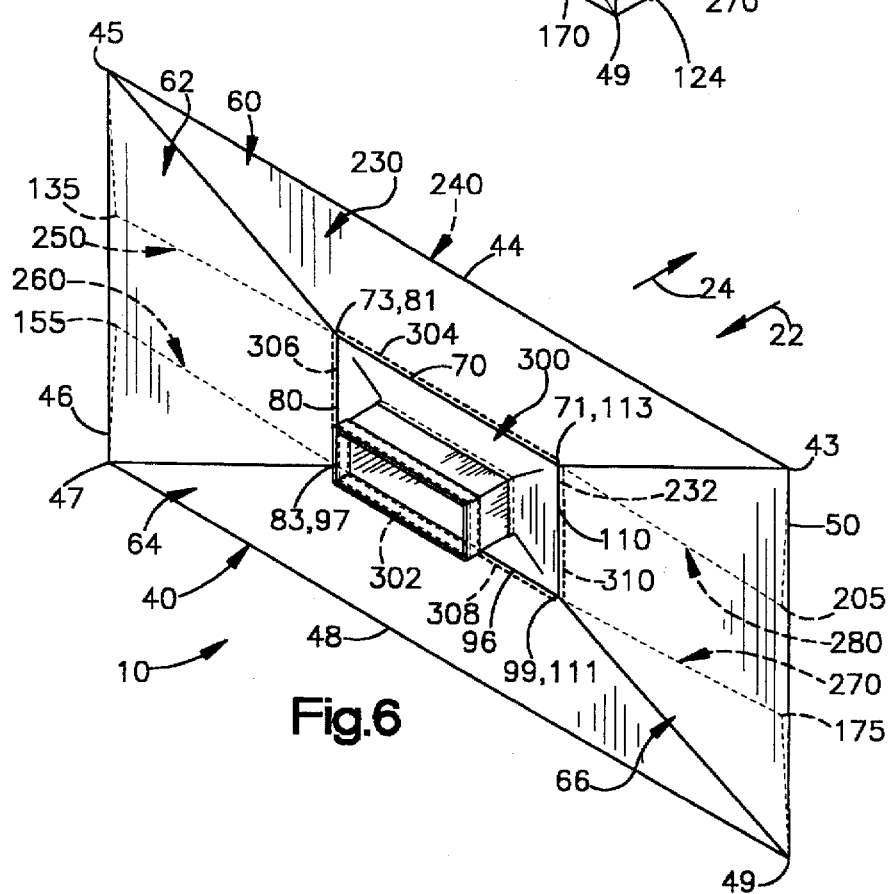

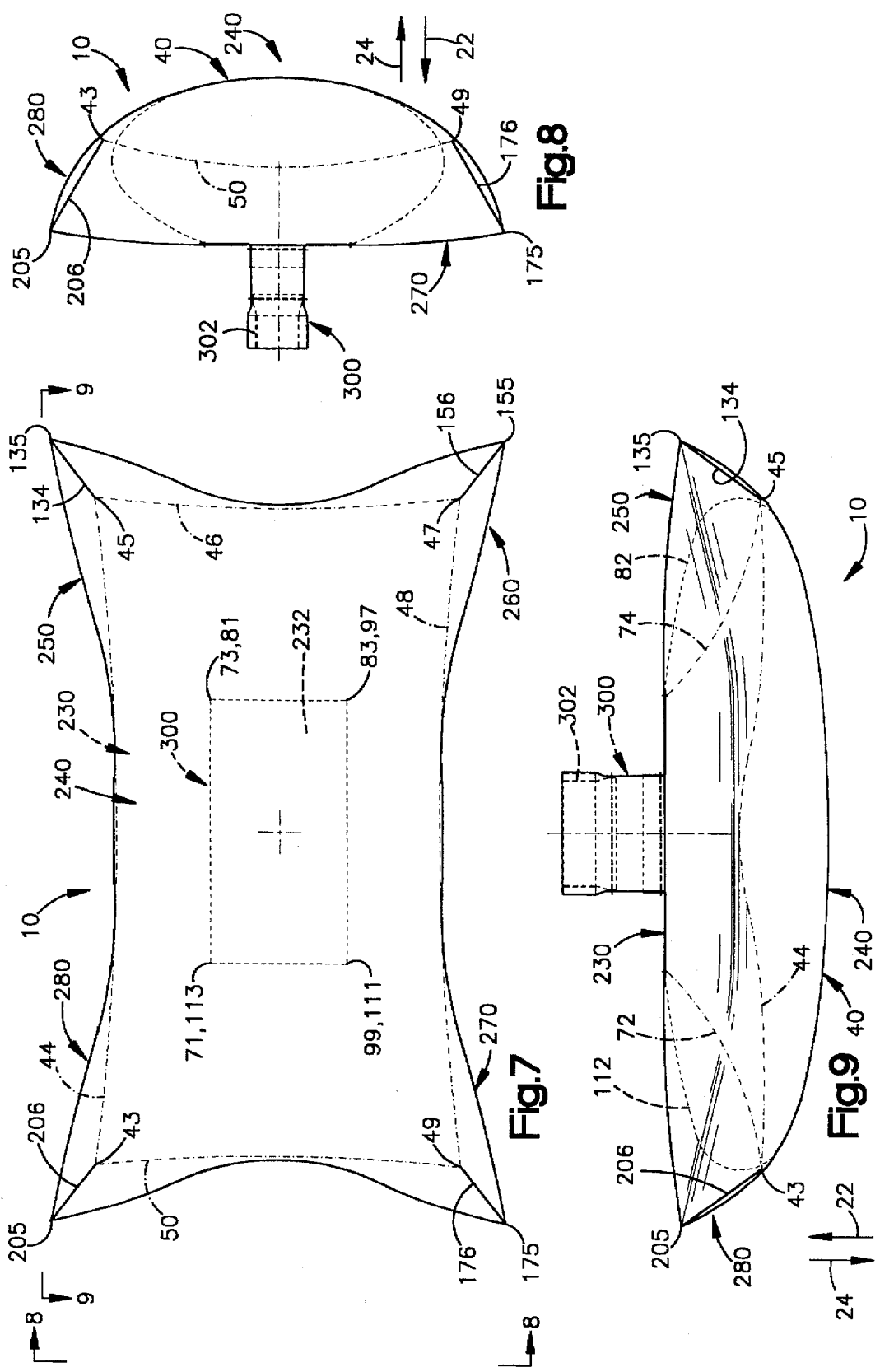

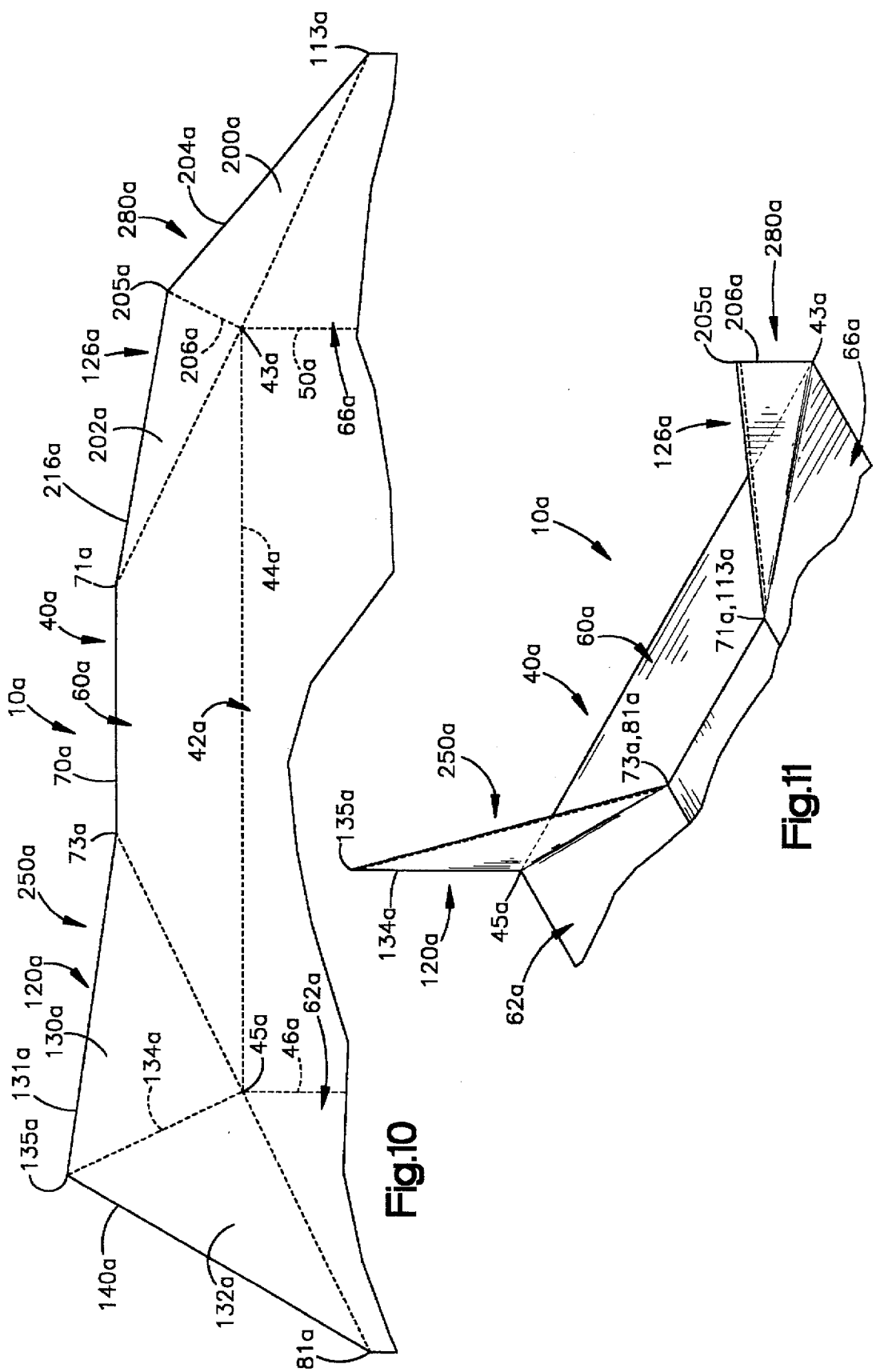

PLEATED AIR BAG

BACKGROUND OF THE INVENTION

1. Technical Field

The present invention relates to a vehicle occupant safety apparatus including an inflatable vehicle occupant protection device, such as an air bag.

2. Description of the Prior Art

It is known to inflate an air bag to help protect an occupant of a vehicle in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

One known type of air bag for helping to protect an occupant of a front seat of a vehicle has a "pillow" configuration. The four corners of a "pillow" configuration air bag have less depth or volume than the center of the air bag.

SUMMARY OF THE INVENTION

The present invention is an inflatable vehicle occupant protection device having a deflated condition and an inflated condition for helping to protect a vehicle occupant. The inflatable device comprises a main panel which defines an inflation fluid volume for receiving inflation fluid to inflate the inflatable device. The main panel includes a generally rectangular front portion having an opening for connection with an inflation fluid source; a generally rectangular back portion for, when inflated, engagement with the vehicle occupant; and at least one pleat portion. The front portion and the back portion of the main panel provide a first portion of the inflatable device with a generally pillow-shaped configuration when the inflatable device is in the inflated condition. The inflatable device has four corners when in the inflated condition. The pleat portion of the main panel is disposed at a corner of the inflatable device. The pleat portion is disposed between the front portion of the main panel and the back portion of the main panel when the inflatable device is in the deflated condition. The pleat portion defines a second portion of the inflatable device when the inflatable device is inflated. The second portion of the inflatable device is disposed outside of the pillow-shaped configuration when the inflatable device is in the inflated condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 5 is a perspective view of the main panel of the air bag of FIG. 1 in a first partially folded condition;

FIG. 6 is a perspective view of the assembled air bag of FIG. 1 shown in a deflated condition;

FIG. 7 is a rear elevational view of the inflated air bag of FIG. 1;

FIG. 8 is a view taken along line 8—8 of FIG. 7;

FIG. 9 is a view taken along line 9—9 of FIG. 7;

FIG. 10 is a fragmentary view, similar to FIG. 3, of a main panel of an air bag which is constructed in accordance with a second embodiment of the present invention; and FIG. 11 is a fragmentary view, similar to FIG. 5, of 5 the main panel of the air bag of FIG. 10.

DESCRIPTION OF PREFERRED EMBODIMENTS

Figure 1:
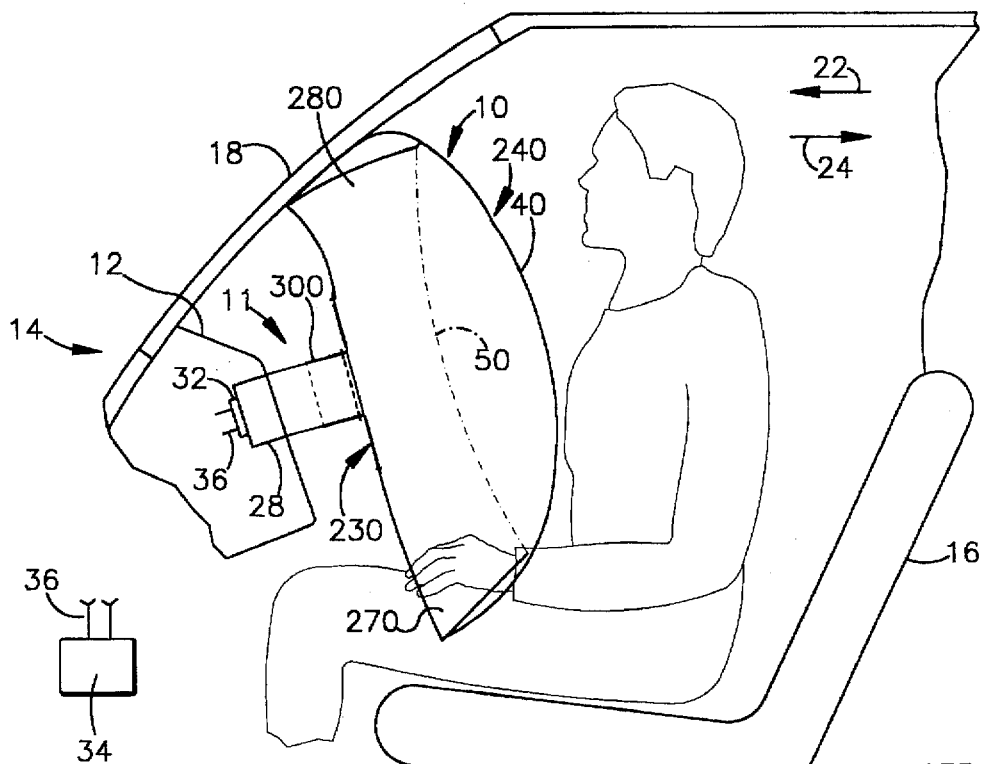
FIG. 1 is a schematic illustration of a portion of a vehicle including a vehicle seat and an instrument panel in which is mounted an air bag module including an air bag which is constructed in accordance with a first embodiment of the present invention.
Figure 2:
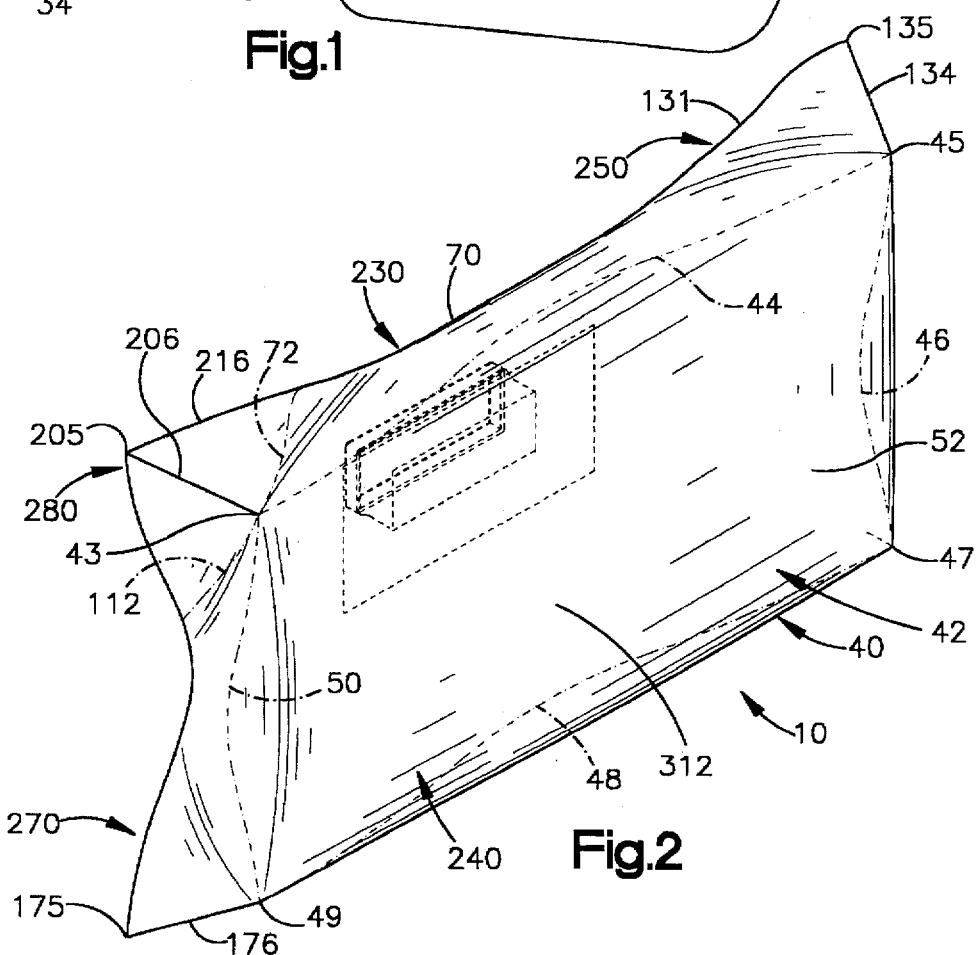
FIG. 2 is a perspective view showing the air bag of FIG. 1 in an inflated condition.

The present invention relates to a vehicle occupant safety apparatus including an inflatable vehicle occupant protection device. As representative of the present invention, FIG. 1 illustrates an inflatable occupant protection device 10, of the type commonly known as an air bag, which is constructed in accordance with the present invention.

The air bag 10 is part of an air bag module 11. The module 11 is mounted in an instrument panel 12 of a vehicle 14, adjacent to a vehicle seat 16. The instrument panel 12 is disposed adjacent to a windshield 18 of the vehicle. A forward direction in the vehicle is indicated by the arrow 22 in FIG. 1, and a rearward direction in the vehicle is indicated by the arrow 24.

The air bag module 11 includes a housing 28 and an inflator 32. The inflator 32 comprises a source of inflation fluid for inflating the air bag 10. As known in the art, the inflator 32 may contain an ignitable gas-generating material which, when ignited, rapidly generates a large volume of gas. The inflator 32 may alternatively contain a stored quantity of pressurized inflation fluid, or a combination of pressurized inflation fluid and ignitable material for heating the inflation fluid.

The inflator 32 has a plurality of fluid outlet openings (not shown) through which inflation fluid is directed into the housing 28 upon actuation of the inflator. Although the housing 28 is shown as a separate structure which is mounted in the instrument panel 12, such a housing could alternatively be defined by the structure of the instrument panel, or by another part of the vehicle 14 from which the air bag 10 is to be inflated to help protect the occupant of the seat 16.

Vehicle electric circuitry indicated schematically at 34 includes a power source, which is preferably the vehicle battery and/or a capacitor, and a normally open switch. The switch is part of a sensor which senses a condition indicating the occurrence of a vehicle collision. The collision-indicating condition may comprise, for example, sudden vehicle deceleration caused by a collision. If the collision-indicating condition sensed by the sensor is above a predetermined threshold, it indicates the occurrence of a collision for which inflation of the air bag 10 is desired to help protect the occupant of the vehicle. The sensor then closes the switch, and an actuation signal is sent to the inflator 32 over lead wires 36. When the inflator 32 is actuated, it emits a large volume of inflation fluid into the housing 28. The housing 28 directs the inflation fluid from the inflator 32 into the air bag 10, to inflate the air bag in a manner described below.

Figure 3:
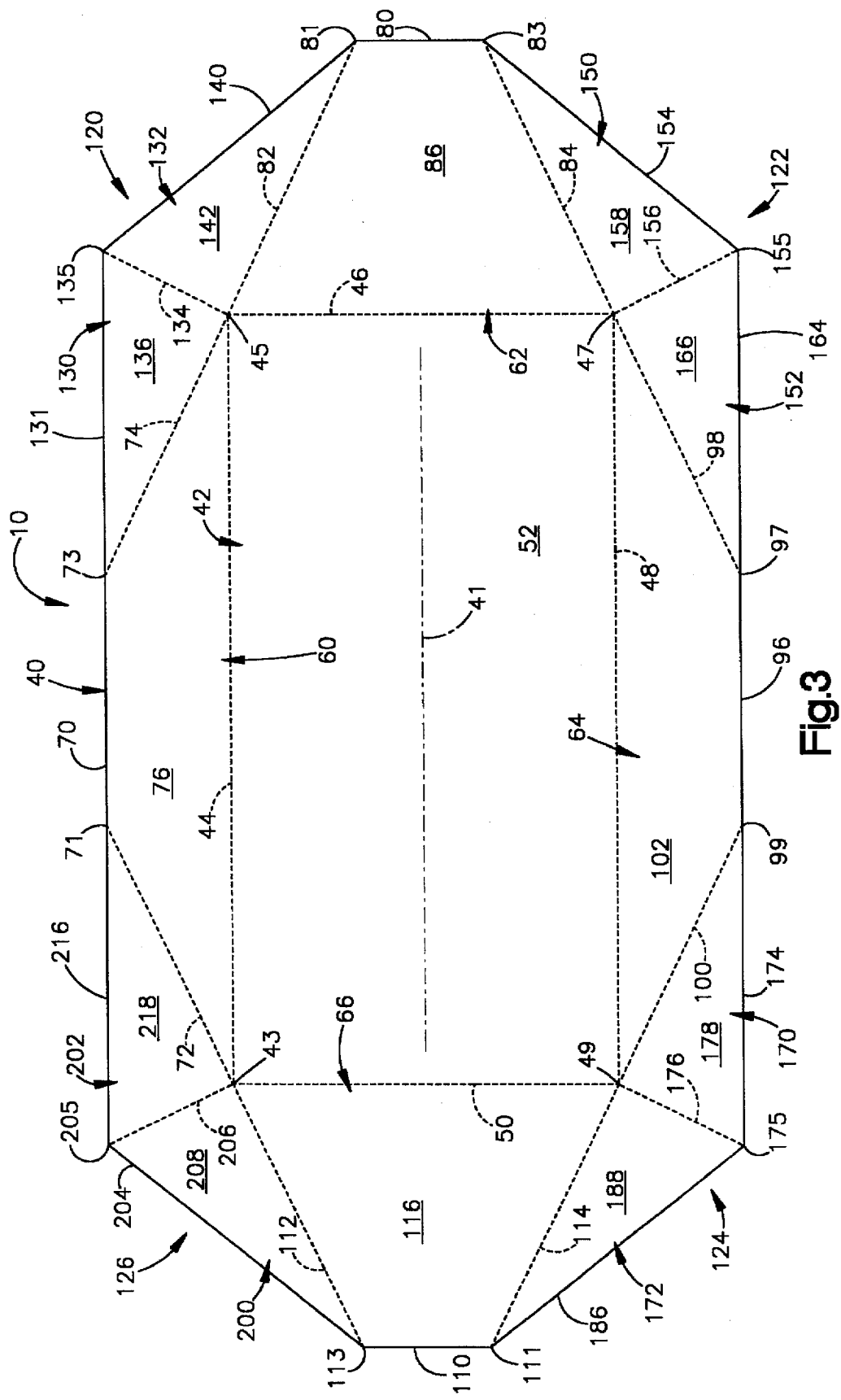
FIG. 3 is a flat plan view of the outer side surface of a main panel of the air bag of FIG. 1.

The air bag 10 is made from a material such as woven 5 nylon. The air bag 10 includes a main panel 40 (FIG. 3)

which, when folded and sewn, defines an inflation fluid volume for receiving inflation fluid to inflate the air bag. The main panel 40 of the air bag 10 is preferably made from a single piece or panel of fabric material. The main panel 40 could, alternatively, be made from a plurality of separate pieces of material which are joined together in a known manner, such as by sewing, or from non-woven material, such as plastic film. The use of plastic film, in particular, would require inflation fluid vents to be formed in the air bag 10, as is known in the art.

The main panel 40 includes a generally rectangular back panel 42 having four side edges 44, 46, 48, and 50. It should be understood that the term "edge" as used herein does not necessarily refer to an actual physical edge of the fabric material of the main panel 40. An "edge", such as the side edges 44, 46, 48 and 50, can be a line about which the main panel 40 is folded in assembly of the air bag 10.

Figure 4:
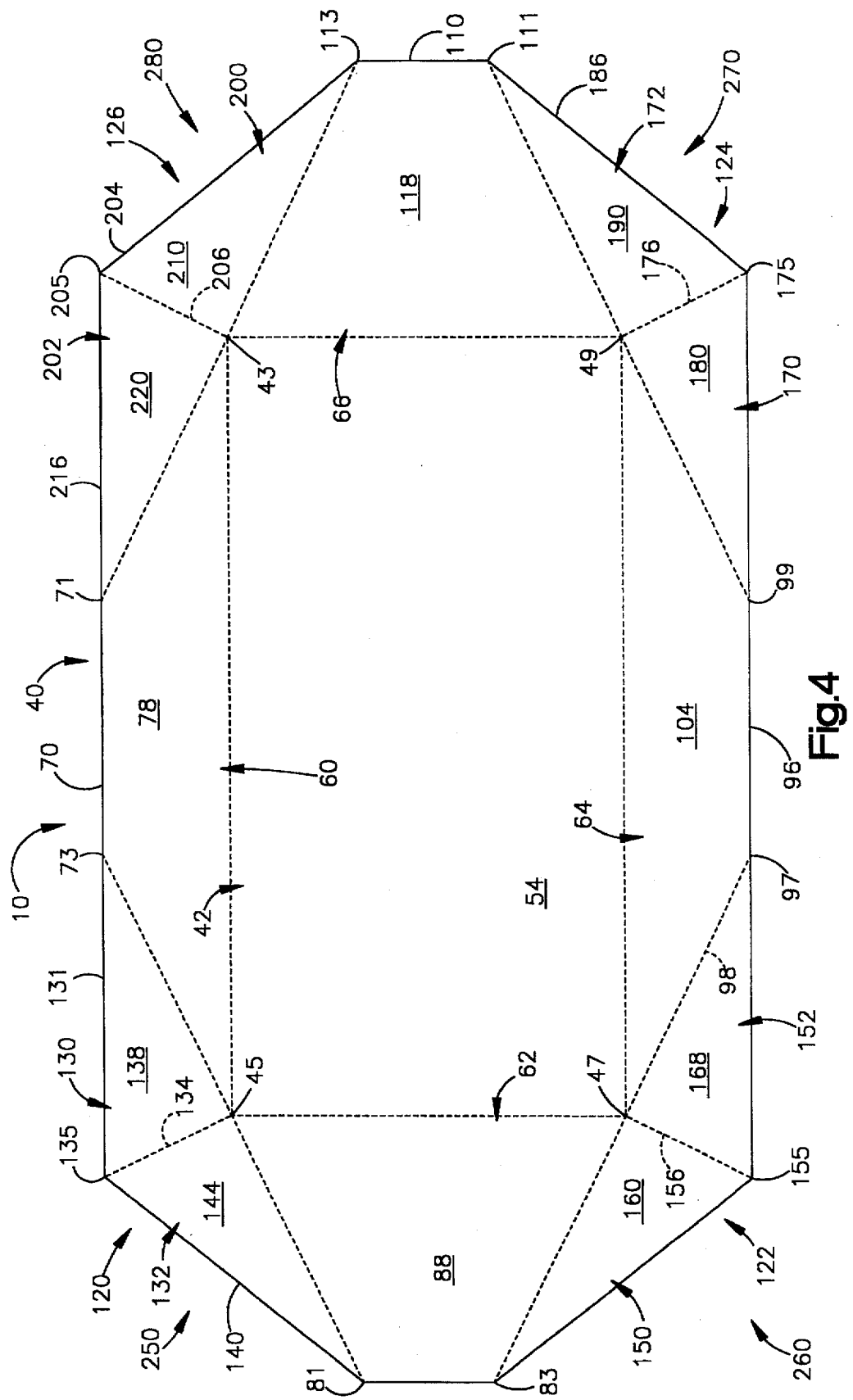
FIG. 4 is a flat plan view of the inner side surface of the main panel of FIG. 3.

The first side edge 44 of the back panel 42 extends between two points on the main panel 40 which are designated 43 and 45. The second side edge 46 extends between the point 45 and a point on the main panel 40 which is designated 47. The third side edge 48 extends between the point 47 and a point on the main panel 40 which is designated 49. The fourth side edge 50 extends between the points 49 and 43. The four points 43, 45, 47 and 49 on the main panel 40 form the four corners of the rectangular back panel 42. The back panel 42 has an outer side surface 52 and an opposite inner side surface 54 (FIG. 4).

The main panel 40 includes four side panels 60, 62, 64, and 66. The side panels 60–66 are connected with the back panel 42 and project away from the back panel. Each one of the side panels 60–66 is generally trapezoidal in configuration, as best seen in FIGS. 3 and 4.

The first side edge 44 (FIG. 3) of the back panel 40 forms an inner edge of the first side panel 60. An outer, shorter edge 70 of the first side panel 60 extends parallel to the inner edge 44 between two points on the panel 40 which are designated 71 and 73. Two non-parallel, transverse edges 72 and 74 of the first side panel 60 extend between the inner edge 44 and the outer edge 70 of the first side panel. The first side panel 60 has an outer side surface 76 and an opposite inner side surface 78 (FIG. 4).

The second side edge 46 (FIG. 3) of the back panel 42 forms an inner edge of the second side panel 62. The second side panel 62 has a shorter, outer edge 80 which extends parallel to the inner edge 46 between two points on the panel 40 which are designated 81 and 83. Two non-parallel, transverse edges 82 and 84 of the second side panel 62 extend between the inner edge 46 and the outer edge 80 of the second side panels. The second side panel 62 has an outer side surface 86 and an opposite inner side surface 88 (FIG. 4). The third side edge 48 (FIG. 3) of the back panel 42 forms an inner edge of the third side panel 64. The third side panel 64 has a shorter, outer edge 96 which extends parallel to the inner edge 48 between two points on the panel 40 which are designated 97 and 99. Two non-parallel, transverse edges 98 and 100 of the third side panel 64 extend between the inner edge 48 and the outer edge 96 of the third side panel. The third side panel has an outer side surface 102 and an opposite inner side surface 104 (FIG. 4).

The fourth side edge 50 (FIG. 3) of the back panel 42 forms an inner edge of the fourth side panel 66. The fourth side panel 66 has a shorter, outer edge 110 which extends parallel to the inner edge 50 between two points on the panel 40 which are designated 111 and 113. Two non-parallel, transverse edges 112 and 114 of the fourth side panel 66 extend between the inner edge 50 and the outer edge 110. The fourth side panel 66 has an outer side surface 116 and an opposite inner side surface 118 (FIG. 4).

The main panel 40 (FIG. 3) includes four pleat panels 120, 122, 124 and 126 which are located at the corners of the main panel. Each one of the pleat panels 120–126 is connected with the back panel 42 and projects away from the back panel, at a location circumferentially intermediate a pair of adjacent side panels. Each one of the pleat panels 120–126 includes two identical parts which are configured as similar right triangles.

The first pleat panel 120 (FIG. 3) includes a first part 130 and a second part 132. The transverse edge 74 of the first side panel 60 forms an inner edge of the first part 130 of the first pleat panel 120. The first part 130 of the first pleat panel 120 has an outer edge 131 which extends between the point 73 and a point on the panel 40 which is designated 135. The outer edge 131 is collinear with the outer edge 70 of the first side panel 60. A central edge 134 of the first pleat panel 120 extends between points 45 and 135 and between the inner edge 74 and the outer edge 131. The first part 130 of the first pleat panel 120 has an outer side surface 136 and an opposite inner side surface 138 (FIG. 4).

The transverse edge 82 of the second side panel 62 forms an inner edge of the second part 132 of the first pleat panel 120. The second part 132 has an outer edge 140 which extends between the points 135 and 81 on the main panel 40. The central edge 134 of the first pleat panel 120 extends between the inner edge 82 and the outer edge 140. The second part 132 has an outer side surface 142 and an inner side surface 144 (FIG. 4).

The second pleat panel 122 (FIG. 3) includes a first part 150 and a second part 152. The transverse edge 84 of the second side panel 62 forms an inner edge of the first part 150 of the second pleat panel 122. The first part 150 has an outer edge 154 which extends between the point 83 and a point on the main panel 40 which is designated 155. A central edge 156 of the second pleat panel 122 extends between the points 47 and 155 and between the inner and outer edges 84 and 154. The first part 150 of the second pleat panel 12 has an outer side surface 158 and an opposite inner side surface 160 (FIG. 4).

The transverse edge 98 of the third side panel 64 forms an inner edge of the second part 152 of the second pleat panel 122. An outer edge 164 of the second part 152 extends between the points 155 and 97 on the panel 40. The central edge 156 of the second pleat panel 122 extends between the inner edge 98 and the outer edge 164. The outer edge 164 is collinear with the outer edge 96 of the third side panel 64. The second part 152 of the second pleat panel 122 has an outer side surface 166 and an opposite inner side surface 168 (FIG. 4).

The third pleat panel 124 includes a first part 170 and a second part 172. The transverse edge 100 of the third side panel 64 forms an inner edge of the first part 170 of the third pleat panel 124. The first part 170 has an outer edge 174 which extends between the point 99 and a point on the panel 40 which is designed 175. The outer edge 174 is collinear with the outer edge 96 of the third side panel 64. A central edge 176 of the third pleat panel 124 extends between the points 49 and 175 and between the inner and outer edges 100 and 174. The first part 170 of the third pleat panel 124 has an outer side surface 178 and an opposite inner side surface 180 (FIG. 4).

The transverse edge 114 of the fourth side panel 66 forms an inner edge of the second part 172 of the third pleat panel 124. The second part 172 has an outer edge 186 which extends between the points 175 and 111 on the panel 40. The central edge 176 of the third pleat panel 124 extends between the inner edge 114 and the outer edge 186. The second part 172 has an outer side surface 188 and an opposite inner side surface 190 (FIG. 4).

The fourth pleat panel 126 includes a first part 200 and a second part 202. The transverse edge 112 of the fourth side panel 66 forms an inner edge of the first part 200 of the fourth pleat panel 126. The first part 200 has an outer edge 204 which extends between the point 113 and a point on the panel 40 which is designated 205. A central edge 206 of the fourth pleat panel 126 extends between the points 43 and 205 and between the inner and outer edges 112 and 204. The first part 200 has an outer side surface 208 and an opposite inner side surface 210 (FIG. 4).

The transverse edge 72 of the first side panel 60 forms an inner edge of the second part 202 of the fourth pleat panel 126. The second part 202 has an outer edge 216 which extends between the points 205 and 71 on the panel 40. The outer edge 216 is collinear with the outer edge 70 of the first side panel 60. The central edge 206 of the fourth pleat panel 126 extends between the inner edge 72 and the outer edge 216. The second part 202 has an inner major side surface 218 and an opposite outer major side surface 220 (FIG. 4).

In assembly of the air bag 10, the main panel 40 (FIG. 5) first is folded along the side edges 44, 46, 48 and 50 such that the side panels 60–66 overlie the back panel 42 and the four pleat panels 120–126 project outward from the plane of the side panels. The inner side surfaces 78, 88, 104 and 118 of the side panels 60, 62, 64 and 66, respectively, overlie the inner side surface 54 of the back panel 42.

The four side panels 60, 62, 64 and 66 of the air bag 10 form a generally rectangular front portion 230 of the air bag. The front portion 230 of the air bag 10 has a rectangular central opening 232 for connection with an inflation fluid source. The back panel 42 of the air bag 10 forms a generally rectangular back portion 240 of the air bag for, when the air bag is inflated, engagement with the vehicle occupant.

The main panel 40 is then sewn along four diagonal stitching lines or seams 242, 244, 246 and 248 (FIG. 5). The first diagonal stitching line or seam 242 joins the outer edge 131 of the first part 130 of the first pleat panel 120 to the outer edge 140 of the second part 132 of the first pleat panel. The first part 130 of the first pleat panel 120 extends generally parallel to and is adjacent to the second part 132, as seen in FIG. 5.

The first pleat panel 120 forms a first pleat portion 250 (FIG. 5) of the air bag 10 which is disposed at a first corner of the air bag. The first pleat portion 250 is not, at this point in the assembly process, disposed between the front portion 230 of the air bag 10 and the back portion 240 of the air bag. That is, the first pleat portion 250 of the air bag 10 is disposed outside of the volume defined by and between the front and back portions 230 and 240 of the air bag.

A second diagonal stitching line or seam 244 joins the outer edge 154 of the first part 150 of the second pleat panel 122 to the outer edge 164 of the second part 152 of the second pleat panel. The second part 152 of the second pleat panel 122 extends generally parallel to and is adjacent to the first part 150 of the second pleat panel. The second pleat panel 122 forms a second pleat portion 260 of the air bag 10 which is disposed at a second corner of the air bag. The second pleat portion 260 of the air bag 10 is not, at this point in the assembly process, disposed between the front portion 230 and the back portion 240 of the air bag. That is, the second pleat portion 260 of the air bag 10 is disposed outside of the volume defined by and between the front and back portions 230 and 240 of the air bag.

The outer edge 174 of the first part 170 of the third pleat panel 124 is sewn to the outer edge 186 of the second part 172 of the third pleat panel with a third diagonal stitching line or seam 246. The first part 170 of the third pleat panel 124 extends generally parallel to and is disposed adjacent to the second part 172 of the third pleat panel. The third pleat panel 124 forms a third pleat portion 270 of the air bag 10 which is disposed at a third corner of the air bag. The third pleat portion 270 is not, at this point in the assembly process, disposed between the front portion 230 and the back portion 240 of the air bag 10. That is, the third pleat portion 270 is disposed outside of the volume defined by and between the front and back portions 230 and 240 of the air bag 10.

A fourth diagonal stitching line or seam 248 joins the outer edge 204 of the first part 200 of the fourth pleat panel 126 to the outer edge 216 of the second part 202 of the fourth pleat panel. The first part 200 of the fourth pleat panel 126 extends generally parallel to and is disposed adjacent to the second part 202 of the fourth pleat panel. The fourth pleat panel 126 forms a fourth pleat portion 280 of the air bag 10 which is disposed at a fourth corner of the air bag. The fourth pleat portion 280 is not, at this point in the assembly process, disposed between the front portion 230 and the back portion 240 of the air bag 10. That is, the fourth pleat portion 280 is disposed outside of the volume defined by and between the front and back portions 230 and 240 of the air bag 10.

After the four diagonal seams 242-248 are sewn, the pleat portions 250, 260, 270 and 280 (FIG. 6) of the air bag 10 are inverted so that they are disposed between the front portion 230 and the back portion 240 of the air bag. That is, the pleat portions 250, 260, 270 and 280 of the air bag 10 are disposed inside the volume defined by and between the overlying front and back portions 230 and 240 of the air bag. Alternatively, the entire main panel 40 can be inverted, to place the sewn edges of the pleat panels 120-126 on the inside of the air bag 10 when the air bag is later inflated.

A retainer panel 300 is then sewn onto the main panel 40. The retainer panel 300 extends across and closes the opening 232 in the front portion 230 of the air bag 10. One stitching line 304 (FIG. 7) joins the retainer panel 300 to the outer edge 70 of the first side panel 60 of the main panel 40. Another stitching line 306 joins the retainer panel 300 to the outer edge 80 of the second side panel 62 of the main panel 40. A stitching line 308 joins the outer edge 96 of the third side panel 64 of the main panel 40 to the retainer panel 300. Another stitching line 310 joins the retaining panel 300 to the outer edge 110 of the fourth side panel 66 of the main panel 40. A known retainer or retaining ring 302 is sewn into the retainer panel in a known manner for helping to secure the air bag 10 to the housing 28.

The air bag 10 is then final folded and/or rolled, in a manner not shown, into a compact shape and installed as part of the module 11 in the vehicle 14. Upon actuation of the inflator 32 as described above, the housing 28 directs inflation fluid from the inflator into the air bag 10. The inflation fluid from the inflator 32 contacts the air bag 10 and causes the air bag to begin to inflate. The air bag 10 inflates into a position (FIG. 1) between the vehicle occupant and the instrument panel 12 to help protect the vehicle occupant from contact with the instrument panel or with other parts of the vehicle 14.

When the air bag 10 is inflated, the first portion of the air bag 10, that is, the front portion 230 and the back portion 240, has a pillow-shaped configuration. This pillow-shaped configuration is indicated schematically by the dot-dash lines in FIGS. 1, 2, and 7–9. The second portion of the air bag 10, that is, the pleat portions 250, 260, 270 and 280, is disposed outside of the pillow-shaped configuration of the first portion of the air bag 10.

Each one of the pleat portions 250, 260, 270 and 280 of the air bag 10 is disposed at a respective corner of the air bag and projects away from the first portion of the air bag. The pleat portions 250, 260, 270 and 280 project outwardly from the first portion of the air bag 10, that is, in a direction away from the center of the pillow-shaped configuration of the first portion of the air bag. Each one of the pleat portions 250, 260, 270 and 280 projects primarily in the forward direction 22, but to some extent also in the rearward direction 24.

The four corners of the pillow-shaped configuration of the first portion of the air bag 10 are the parts having the least depth, that is, having the smallest dimension as measured in a front-to-back direction in the vehicle 14. The pleat portions 250, 260, 270 and 280 of the air bag 10, which are located at the corners of the air bag, add depth and volume to the air bag in these areas. This extra volume at the corners of the air bag 10 can help to cushion and protect an out of position vehicle occupant who contacts a corner of the air bag rather than the center area 312 (FIG. 2) of the back panel 42. This extra volume at the corners of the air bag 10 also can help to cushion and protect a vehicle occupant in the event of an angular (not frontal) collision to the vehicle 14.

An air bag which is constructed in accordance with the present invention can have pleat portions of different sizes at different corners, in order to provide a particular desired configuration when inflated. As an example, FIGS. 10 and 11 illustrate portions of a main panel 40a of an air bag 10a which is constructed in accordance with a second embodiment of the present invention. Illustrated parts of the air bag 10a which are the same as parts of the air bag 10 (FIGS. 1–9) are given the same reference numeral with the suffix "a" added for clarity. Parts of the air bag 10a which are not shown are identical to corresponding parts of the air bag 10.

The main panel 40a of the air bag 10a is similar in size and configuration to the main panel 40 with the exception that the main panel 40a has two pleat panels 120a and 126a which differ in size from the pleat panels 120 and 126 of the air bag 10. The first pleat panel 120a (FIG. 10) has a central edge 134a which is longer than the central edge 134 (FIG. 4) of the first pleat panel 120. The outer edges 131a and 140a (FIG. 10) of the first pleat panel 120a are longer than the outer edges 131 and 140 (FIG. 4) of the first pleat panel 120. Accordingly, the outer edge 131a is not collinear with the outer edge 70a of the side panel 60a.

The first pleat panel 120a of the main panel 40a forms a first pleat portion 250a (FIG. 11) of the air bag 10a. The first pleat portion 250a, when in an inflated condition (not shown), projects from the front and back portions 230a and 240a of the air bag 10a by a distance which is more than the distance by which the first pleat portion 250 (FIG. 5) projects from the front and back portions 230 and 240 of the air bag 10.

The fourth pleat panel 126a (FIG. 10) of the main panel 40 a of the air bag 10a has a central edge 206a which is shorter than the central edge 206 of the fourth pleat panel 126 (FIG. 4). The outer edges 204a and 216a (FIG. 10) of the fourth pleat panel 126a are shorter than the outer edges 204 and 216 of the fourth pleat panel 126 (FIG. 4). Accordingly, the outer edge 216a is not collinear with the outer edge 70a of the side panel 60a.

The fourth pleat panel 126a of the main panel 40a forms a fourth pleat portion 280a (FIG. 11) of the air bag 10a. The fourth pleat portion 280a, when in an inflated condition (not shown), projects from the front and back portions 230a and 240a of the air bag 10a by a distance which is less than the distance by which the fourth pleat portion 280 (FIG. 5) projects from the front and back portions 230 and 240 of the air bag 10.

From the above description of the invention, those skilled in the art will perceive improvements, changes and modifications in the invention. For example, the individual triangular parts of the pleat panels need not have a right triangular configuration as illustrated. Also, the air bag could include pleat portions at one or more but not all of its corners. Such improvements, changes and modifications within the skill of the art are intended to be covered by the appended claims.

Having described the invention, I claim:

1. An inflatable vehicle occupant protection device having a deflated condition and an inflated condition for helping to protect a vehicle occupant, said inflatable device comprising:

a main panel which defines an inflation fluid volume for receiving inflation fluid to inflate said inflatable device, said main panel including a generally rectangular central portion, four side portions, and four pleat portions;

said central portion of said main panel having four side edges, each one of said side portions of said main panel being connected with said central portion of said main panel along a respective side edge of said central portion, said side portions projecting away from said central portion;

said main panel being folded along said side edges such that said side portions of said main panel overlie said central portion of said main panel;

said side portions of said main panel defining an inflation fluid opening for directing inflation fluid into said inflation fluid volume;

said central portion of said main panel and said side portions of said main panel providing said inflatable device with a generally pillow-shaped configuration when said inflatable device is in the inflated condition;

each one of said pleat portions of said main panel being connected with said central portion of said main panel intermediate a pair of adjacent ones of said side portions of said main panel;

each one of said pleat portions of said main panel projecting away from said pillow-shaped configuration when said inflatable device is in the inflated condition.

2. An apparatus as set forth in claim 1 wherein each one of said side portions is generally trapezoidal in configuration and each one of said pleat portions is generally triangular in configuration.

3. An apparatus as set forth in claim 2 wherein each one of said side portions has an outer edge which forms an outer edge of said main panel, each one of said pleat portions having two outer edges which are not collinear with each other, at least one of said two outer edges of said pleat portions being collinear with a respective adjoining outer edge of an adjacent side panel.

4. An apparatus as set forth in claim 2 wherein each one of said side panels has an outer edge which forms an outer edge of said main panel, at least one of said pleat portions having no outer edges which are collinear with the adjoining outer edges of the adjacent side panels.

5. An apparatus as set forth in claim 1 wherein each one of said pleat portions comprises two parts which are configured as similar triangles.

6. An apparatus as set forth in claim 5 wherein each respective one of said pleat portions includes a respective stitching section joining respective outer edges of said two parts of said pleat portion.

7. An apparatus as set forth in claim 1 wherein said back panel is generally rectangular in configuration.

8. An apparatus as set forth in claim 1 wherein said central portion and said side portions of said main panel provide a first portion of said inflatable device with a generally pillow-shaped configuration when said inflatable device is in the inflated condition;

said pleat portions defining a second portion of said inflatable device when said inflatable device is inflated;

said second portion of said inflatable device being disposed between said central portion of said main panel and said side portions of said main panel when said inflatable device is in the deflated condition;

said second portion of said inflatable device being disposed outside of said pillow-shaped configuration when said inflatable device is in the inflated condition.

9. An inflatable vehicle occupant protection device having a deflated condition and an inflated condition for helping to protect a vehicle occupant, said inflatable device comprising:

a main panel which defines an inflation fluid volume for receiving inflation fluid to inflate said inflatable device, said main panel including a generally rectangular front portion having an opening for connection with an inflation fluid source, a generally rectangular back portion for, when inflated, engagement with the vehicle occupant and a pleat portion;

said front portion and said back portion of said main panel providing a first portion of said inflatable device with a generally pillow-shaped configuration when said inflatable device is in the inflated condition;

said inflatable device having four corners when in the inflated condition, said pleat portion of said main panel being disposed at a corner of said inflatable device;

said pleat portion defining a second portion of said inflatable device when said inflatable device is inflated;

said second portion of said inflatable device being disposed between said front portion of said main panel and said back portion of said main panel when said inflatable device is in the deflated condition;

said second portion of said inflatable device inflating to a position outside of said pillow-shaped configuration when said inflatable device is in the inflated condition;

said front portion of said inflatable device comprising a plurality of side panels, said pleat portion being formed as part of said main panel intermediate a pair of adjacent ones of said side panels.

10. An apparatus as set forth in claim 9 wherein each one of said side panels is generally trapezoidal in configuration and said pleat portion is generally triangular in configuration.

11. An apparatus as set forth in claim 10 wherein each one of said side panels has an outer edge which forms an outer edge portion of said main panel, said triangular pleat portion having two outer edges which are not collinear with each other, at least one of said two outer edges of said triangular pleat portion being collinear with a respective adjoining outer edge of an adjacent side panel.

12. An apparatus as set forth in claim 10 wherein each one of said side panels has an outer edge which forms an outer edge of said main panel, said pleat portion having no edges which are collinear with the adjoining outer edges of the adjacent side panels.

13. An inflatable vehicle occupant protection device having a deflated condition and an inflated condition for helping to protect a vehicle occupant, said inflatable device comprising:

a main panel which defines an inflation fluid volume for receiving inflation fluid to inflate said inflatable device, said main panel including a generally rectangular front portion having an opening for connection with an inflation fluid source, a generally rectangular back portion for, when inflated, engagement with the vehicle occupant, and a pleat portion;

said front portion and said back portion of said main panel providing a first portion of said inflatable device with a generally pillow-shaped configuration when said inflatable device is in the inflated condition;

said inflatable device having four corners when in the inflated condition, said pleat portion of said main panel being disposed at a corner of said inflatable device;

said pleat portion defining a second portion of said inflatable device when said inflatable device is inflated;

said second portion of said inflatable device being disposed between said front portion of said main panel and said back portion of said main panel when said inflatable device is in the deflated condition;

said second portion of said inflatable device inflating to a position outside of said pillow-shaped configuration when said inflatable device is in the inflated condition;

said pleat portion comprising two parts which are configured as similar triangles.

14. An apparatus as set forth in claim 13 wherein said pleat portion includes a stitching section joining outer edges of said two parts of said pleat portion.

15. An inflatable vehicle occupant protection device having a deflated condition and an inflated condition for helping to protect a vehicle occupant, said inflatable device comprising:

a main panel which defines an inflation fluid volume for receiving inflation fluid to inflate said inflatable device, said main panel including a generally rectangular front portion having an opening for connection with an inflation fluid source, a generally rectangular back portion for, when inflated, engagement with the vehicle occupant, and a pleat portion;

said front portion and said back portion of said main panel providing a first portion of said inflatable device with a generally pillow-shaped configuration when said inflatable device is in the inflated condition;

said inflatable device having four corners when in the inflated condition, said pleat portion of said main panel being disposed at a corner of said inflatable device;

said pleat portion defining a second portion of said inflatable device when said inflatable device is inflated;

said second portion of said inflatable device being disposed between said front portion of said main panel and said back portion of said main panel when said inflatable device is in the deflated condition;

said second portion of said inflatable device being disposed outside of said pillow-shaped configuration when said inflatable device is in the inflated condition;

said front portion of said inflatable device comprising a plurality of panels which are spaced around said back panel and which are folded relative to said back panel to define a central opening of said inflatable device for receiving inflation fluid, said pleat portion projecting from said first portion of said inflatable device in a direction away from said central opening.

16. An inflatable vehicle occupant protection device having a deflated condition and an inflated condition for helping to protect a vehicle occupant, said inflatable device comprising:

a panel structure having a major portion with a generally rectangular pillow-shaped configuration when said inflatable device is in the inflated condition;

said panel structure further having an inflatable pleat portion with a generally triangular configuration projecting diagonally from a corner of said major portion when said inflatable device is in the inflated condition, said pleat portion of said panel structure being in a deflated condition disposed within said major portion of said panel structure when said inflatable device is in the deflated condition.

17. An apparatus as defined in claim 16 wherein said inflatable pleat portion of said panel structure is one of four inflatable triangular pleat portions of said panel structure, each of which is inflated and projects diagonally from a corresponding corner of said major portion when said inflatable device is in the inflated condition.

18. An apparatus as defined in claim 17 wherein each of said inflatable pleat portions of said panel structure is disposed within said major portion of said panel structure in a deflated condition when said inflatable device is in the deflated condition.

* * * * *